(12) United States Patent
Bingham

(10) Patent No.: US 9,523,496 B2
(45) Date of Patent: Dec. 20, 2016

(54) INTEGRAL PRESSURIZED WATER REACTOR WITH EXTERNAL STEAM DRUM

(75) Inventor: Billy E. Bingham, Lynchburg, VA (US)

(73) Assignee: BWXT Nuclear Energy, Inc., Charlotte, NC (US)

( * ) Notice: Subject to any disclaimer, the term of this patent is extended or adjusted under 35 U.S.C. 154(b) by 494 days.

(21) Appl. No.: 13/351,940

(22) Filed: Jan. 17, 2012

(65) Prior Publication Data

US 2013/0182813 A1    Jul. 18, 2013

(51) Int. Cl.
| | | |
|---|---|---|
| G21C 15/16 | (2006.01) | |
| F22B 1/02 | (2006.01) | |
| G21C 1/32 | (2006.01) | |
| G21C 15/26 | (2006.01) | |

(52) U.S. Cl.
CPC .............. *F22B 1/023* (2013.01); *G21C 1/322* (2013.01); *G21C 15/26* (2013.01); *G21C 15/16* (2013.01); *Y02E 30/32* (2013.01)

(58) Field of Classification Search
CPC ................................ G21C 15/16; G21C 1/322
USPC ....... 376/366, 370, 371, 373, 378, 395, 401, 376/406
See application file for complete search history.

(56) References Cited

U.S. PATENT DOCUMENTS

| | | | | |
|---|---|---|---|---|
| 3,052,615 A | * | 9/1962 | Johns et al. ................... | 376/408 |
| 3,544,424 A | * | 12/1970 | Mayer et al. .................. | 376/371 |
| 3,599,424 A | * | 8/1971 | Yampolsky .................... | 376/378 |
| 3,804,069 A | | 4/1974 | Bennett | |
| 4,038,134 A | * | 7/1977 | Dorner et al. ................. | 376/402 |
| 4,072,563 A | * | 2/1978 | McDonald et al. ........... | 376/406 |
| 4,261,298 A | * | 4/1981 | McDonald et al. ............ | 122/32 |
| 4,324,617 A | * | 4/1982 | Sowers et al. ................. | 376/405 |
| 4,911,880 A | * | 3/1990 | Kasai et al. ................... | 376/371 |
| 5,053,190 A | * | 10/1991 | Gardner et al. ............... | 376/366 |
| 5,076,999 A | * | 12/1991 | Forsberg ........................ | 376/367 |

(Continued)

FOREIGN PATENT DOCUMENTS

| | | |
|---|---|---|
| CN | 1589482 A | 3/2005 |
| CN | 101154472 | 4/2008 |

(Continued)

OTHER PUBLICATIONS

Shulyak, "Westinghouse Small Modular Reactor Development Overview", IAEA, Jul. 4, 2011.*

(Continued)

*Primary Examiner* — Jack W Keith
*Assistant Examiner* — Daniel Wasil
(74) *Attorney, Agent, or Firm* — Nelson Mullins Riley & Scarborough, LLP

(57) ABSTRACT

A pressurized water reactor (PWR) includes: a pressure vessel divided into an upper plenum containing primary coolant, a lower plenum containing primary coolant, and a steam generator plenum interposed between the upper plenum and the lower plenum and containing secondary coolant; a nuclear reactor core comprising fissile material disposed in the lower plenum; one or more risers arranged to convey primary coolant upward from the nuclear reactor core to the upper plenum; and a plurality of tubes passing through the steam generator plenum and arranged to convey primary coolant downward from the upper plenum to the lower plenum. A steam separator is operatively connected with the steam generator plenum to separate secondary coolant in the steam phase from secondary coolant in the water phase.

17 Claims, 2 Drawing Sheets

(56) References Cited

U.S. PATENT DOCUMENTS

| | | | |
|---|---|---|---|
| 5,158,742 A * | 10/1992 | Dillmann | 376/299 |
| 6,259,760 B1 | 7/2001 | Carelli et al. | |
| 6,498,827 B1 | 12/2002 | Klarner | |
| 6,772,832 B2 | 8/2004 | Schneider | |
| 6,810,101 B2 | 10/2004 | Klarner | |
| 6,997,141 B2 | 2/2006 | Sun | |
| 7,154,982 B2 | 12/2006 | Gautier et al. | |
| 8,542,792 B1 | 9/2013 | Young et al. | |
| 2005/0018806 A1* | 1/2005 | Gautier et al. | 376/406 |
| 2007/0201599 A1 | 8/2007 | Fushimi et al. | |
| 2009/0010374 A1 | 1/2009 | Nishiguchi et al. | |
| 2009/0154631 A1 | 6/2009 | Wepfer et al. | |
| 2010/0316181 A1* | 12/2010 | Thome et al. | 376/372 |
| 2011/0103538 A1 | 5/2011 | Steinmoeller | |
| 2011/0222642 A1 | 9/2011 | Gautier | |
| 2013/0028367 A1* | 1/2013 | Shargots et al. | 376/372 |
| 2013/0108005 A1* | 5/2013 | Shargots | 376/361 |
| 2013/0121453 A1* | 5/2013 | Shargots et al. | 376/395 |
| 2014/0321598 A1* | 10/2014 | Ales | 376/406 |

FOREIGN PATENT DOCUMENTS

| | | |
|---|---|---|
| CN | 201936630 U | 8/2011 |
| CN | 102282625 A | 12/2011 |
| CN | 102282628 A | 12/2011 |

OTHER PUBLICATIONS

International Search Report and Written Opinion dated Sep. 6, 2013 for PCT/US2013/020521.
First Office Action dated Feb. 14, 2016, for Chinese Application No. 201210532016.8.

* cited by examiner

INTEGRAL PRESSURIZED WATER REACTOR WITH EXTERNAL STEAM DRUM

BACKGROUND

The following relates to the nuclear reactor arts, nuclear power generation arts, nuclear safety arts, and related arts.

A conventional pressurized water reactor (PWR) includes a cylindrical pressure vessel containing a nuclear reactor core comprising a fissile material. The reactor core is located near the bottom of the pressure vessel, which is filled with primary coolant water. During operation, the reactor core heats the primary coolant water and the heated water tends to rise. A cylindrical central riser located above the reactor core and coaxially inside the pressure vessel conveys the rising heated water to near the top of the pressure vessel where the heated water discharges and flows back down through a "downcomer" annulus defined between the central riser and the inside wall of the cylindrical pressure vessel to complete the primary coolant flow circuit. This primary coolant circulation can occur naturally (i.e., natural circulation) driven by the heat generated by the reactor core. Additionally or alternatively, a set of reactor coolant pumps can be provided to assist or drive the primary coolant circulation.

In a conventional PWR the primary coolant is piped out of the pressure vessel and into an external steam generator. This steam generator is a heat exchanger in which the piped primary coolant serves as the heat source for heating secondary coolant water flowing through a secondary coolant flow path within the steam generator. Typically, two or more external steam generators are operated in parallel, so as to provide a level of redundancy.

An integral PWR is a design variant in which the steam generator is located inside the pressure vessel. Typically, the steam generator is annular (or a set of steam generators form an annular assembly) that is disposed in the downcomer annulus. The primary coolant flowing downward through the downcomer annulus serves as the heat source, and secondary coolant is flowed into the pressure vessel and upward through the steam generator to remove the thermal energy. The steam generator typically has a tube-and-shell configuration in which an assembly of tubes is surrounded by a shell. In some such configurations, the primary coolant flows downward through the tubes (i.e., tube-side) and the secondary coolant flows upward through the shell (i.e., shell-side). Alternatively, the downward primary coolant flow may be shell-side while the upward secondary coolant flow may be tube-side. The tubes may have various geometries, such as straight vertical tubes, or helical tubes winding around the central riser, or so forth. Integral PWR designs employing helical steam generator tubes are described in Thome et al., "Integral Helical-Coil Pressurized Water Nuclear Reactor", U.S. Pub. No. 2010/0316181 A1 published Dec. 16, 2010 which is incorporated herein by reference in its entirety.

In some integral PWR designs, the steam generator outputs dry single-phase steam directly suitable to drive a turbine or other steam-driven machinery. Alternatively, if the steam generator outputs wet steam or a steam-water mix, then it can be dried in an external steam drum. See, e.g. Shulyak, "Westinghouse Small Modular Reactor Development Overview", presented at the Interregional Workshop on Advanced Nuclear Reactor Technology for Near Term Deployment, International Atomic Energy Agency (IAEA), Vienna, Austria, Jul. 4-8, 2011.

BRIEF SUMMARY

In one aspect of the disclosure, a pressurized water reactor (PWR) includes: a pressure vessel divided into an upper plenum containing primary coolant, a lower plenum containing primary coolant, and a steam generator plenum interposed between the upper plenum and the lower plenum and containing secondary coolant; a nuclear reactor core comprising fissile material disposed in the lower plenum; one or more risers arranged to convey primary coolant upward from the nuclear reactor core to the upper plenum; and a plurality of tubes passing through the steam generator plenum and arranged to convey primary coolant downward from the upper plenum to the lower plenum. A steam separator is operatively connected with the steam generator plenum to separate secondary coolant in the steam phase from secondary coolant in the water phase.

In another aspect of the disclosure, a pressurized water reactor (PWR) includes: a pressure vessel divided into an upper plenum containing primary coolant, a lower plenum containing primary coolant, and a steam generator plenum interposed between the upper plenum and the lower plenum and containing secondary coolant; a nuclear reactor core comprising fissile material disposed in the lower plenum; one or more risers arranged to convey primary coolant upward from the nuclear reactor core to the upper plenum; and a plurality of tubes passing through the steam generator plenum and arranged to convey primary coolant downward from the upper plenum to the lower plenum. A steam separator is operatively connected with the steam generator plenum to separate secondary coolant in the steam phase from secondary coolant in the water phase. There is there is no pump configured to actively circulate secondary coolant between the steam generator plenum and the steam separator.

In another aspect of the disclosure, a pressurized water reactor (PWR) includes: a pressure vessel divided into an upper plenum containing primary coolant, a lower plenum containing primary coolant, and a steam generator plenum interposed between the upper plenum and the lower plenum and containing secondary coolant; a nuclear reactor core comprising fissile material disposed in the lower plenum; one or more risers arranged to convey primary coolant upward from the nuclear reactor core to the upper plenum; and a plurality of tubes passing through the steam generator plenum and arranged to convey primary coolant downward from the upper plenum to the lower plenum. A steam separator is operatively connected with the steam generator plenum to separate secondary coolant in the steam phase from secondary coolant in the water phase. The steam generator plenum does not include or contain piping arranged to convey secondary coolant along a defined flow path. For example, the steam generator plenum does not include or contain a shell-and-tube steam generator in which one of primary coolant and secondary coolant flows in a one direction in tubes of the shell-and-tube steam generator and the other of primary coolant and secondary coolant flows in an opposite direction in the shell of the shell-and-tube steam generator.

In another aspect of the disclosure, a pressurized water reactor (PWR) includes: a pressure vessel divided into an upper plenum containing primary coolant, a lower plenum containing primary coolant, and a steam generator plenum interposed between the upper plenum and the lower plenum and containing secondary coolant; a nuclear reactor core comprising fissile material disposed in the lower plenum; a plurality of riser tubes passing through an inboard cylindrical region of the steam generator plenum and arranged to convey primary coolant upward from the nuclear reactor core to the upper plenum; and a plurality of tubes arranged to convey primary coolant downward from the upper plenum to the lower plenum wherein the tubes pass through an outboard annular region of the steam generator plenum that surrounds the inboard cylindrical region of the steam generator plenum. A steam separator is operatively connected with the steam generator plenum to separate secondary coolant in the steam phase from secondary coolant in the water phase.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
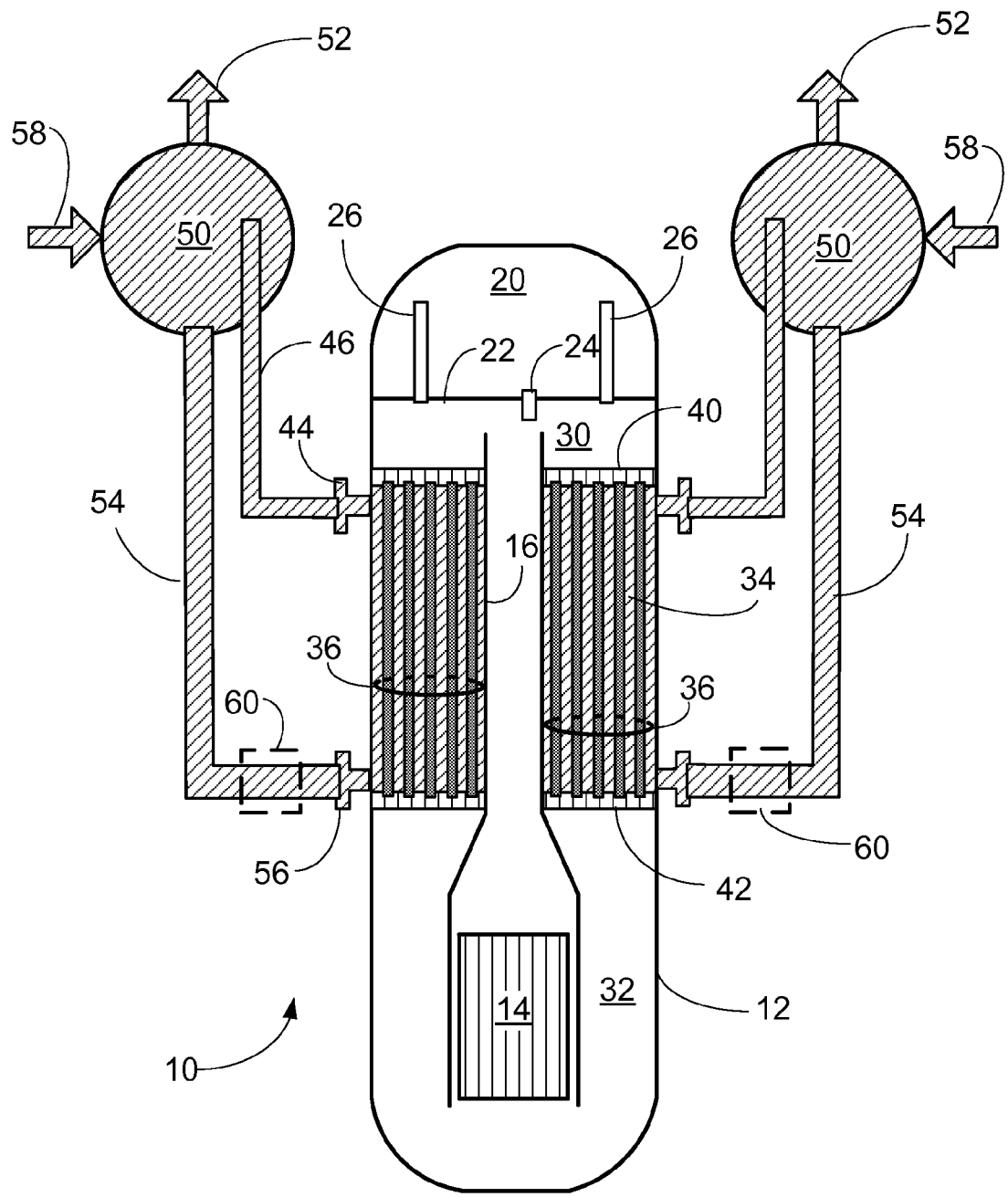
FIGS. 1 and 2 diagrammatically show diagrammatic side sectional views of two illustrative pressurized water reactor (PWR) designs described herein.

With reference to FIG. 1, an illustrative nuclear reactor of the pressurized water reactor (PWR) type 10 includes a pressure vessel 12, which in the illustrative embodiment is a cylindrical vertically mounted vessel. (Note that the term "cylindrical" as used herein does not require a mathematically precise cylinder, but rather allows for deviations such as changes in diameter along the length of the cylinder axis, inclusion of vessel penetrations or other localized features, or so forth). A nuclear reactor core 14 is disposed in a lower portion of the pressure vessel 12. The reactor core 14 includes a mass of fissile material, such as a material containing uranium oxide ($UO_2$) that is enriched in the fissile $^{235}U$ isotope, in a suitable matrix material. In a typical configuration, the fissile material is arranged as "fuel rods" arranged in a core basket. The pressure vessel 12 contains primary coolant water (typically light water, that is, $H_2O$, although heavy water, that is, $D_2O$, is also contemplated) in a subcooled state. A hollow cylindrical central riser 16 is disposed concentrically within the cylindrical pressure vessel 12 to funnel primary coolant heated by the radioactive reactor core 14 generally upward.

The illustrative PWR 10 includes an internal pressurizer volume 20 defined by a top portion of the pressure vessel 12 and a baffle plate 22. The baffle plate 22 provides a restricted fluid communication between the pressurizer volume 20 above the baffle plate 22 and the remainder of the volume of the pressure vessel 12 disposed below the baffle plate 22. In a suitable embodiment, the baffle plate 22 is a steel plate spanning the diameter of the pressure vessel 12, and the restricted fluid communication is provided by constricted passages such as a surge line 24 and vent pipes 26. During normal operation of the PWR 10, the pressurizer volume 20 contains a steam bubble filling some but not all of the volume 20, and the pressure of this steam bubble is adjusted by pressure control devices (not shown) such as heaters (to heat the bubble so as to increase pressure) and spargers (to inject cooler steam or water into the bubble so as to reduce pressure). The controlled pressure of the steam bubble transfers to the lower (operational) volume of the pressure vessel 12 below the baffle plate 22 via the passages 24, 26. Instead of an integral pressurize as illustrated, it is contemplated to employ a separate external pressurizer that is connected with the pressure vessel 12 via suitable piping.

The PWR 10 includes other components known in the art that are not shown, such as a "basket" or other structure supporting the reactor core 14 in the pressure vessel 12, neutron-absorbing control rods selectively inserted into the reactor core 14 by a control rod drive mechanism (CRDM) to control the nuclear chain reaction, various thermal and/or radiative shielding, or so forth. These various components may be variously disposed inside or outside the pressure vessel. For example, the CRDM may be external, as is conventionally the case, or may be located internally inside the pressure vessel as described in Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Intl Pub. WO 2010/144563 A1 published Dec. 16, 2010 which is incorporated herein by reference in its entirety.

The pressure vessel 12 is divided into an upper plenum 30 containing primary coolant and a lower plenum 32 containing primary coolant and the nuclear reactor core 14. The upper plenum 30 is located below the baffle plate 22 such that the baffle plate 22 delineates the boundary between the pressurizer volume 20 and the upper plenum 30. The hollow cylindrical central riser 16 is arranged to convey primary coolant upward from the nuclear reactor core 14 in the lower plenum 32 to the upper plenum 30. Additionally, a steam generator plenum 34 is interposed between the upper plenum 30 and the lower plenum 32. In the embodiment of FIG. 1 the steam generator plenum 34 is a steam generator annulus 34 that encircles or surrounds the hollow cylindrical central riser 16. The steam generator plenum 34 contains secondary coolant (diagrammatically indicated by cross-hatching in FIG. 1).

The primary coolant circuit is completed by a plurality of tubes 36 passing through the steam generator annulus 34. The tubes 36 are arranged to convey primary coolant downward from the upper plenum 30 to the lower plenum 32. In a suitable arrangement, an upper annular tube sheet 40 connects with upper ends of the tubes 36 and defines the boundary between the upper plenum 30 and the steam generator plenum 34, and a lower annular tube sheet 42 connects with lower ends of the tubes 36 and defines the boundary between the lower plenum 32 and the steam generator plenum 34. Thus, starting at the reactor core 14 the primary coolant flows upward through the hollow cylindrical central riser 16 discharging at the top into the upper plenum 30, enters the upper tube sheet 40 and flows downward through the tubes 36 discharging out of the lower tube sheet 42 back into the lower plenum 32, where it re-enters the reactor core 14 from below. The primary coolant flow may be driven by natural circulation, that is, convective flow driven by heat generated by the reactor core 14. Additionally or alternatively, reactor coolant pumps (not shown) may be provided to actively assist or drive the primary coolant circulation. If provided, such reactor coolant pumps may couple at substantially any point of the primary coolant circuit, and may be wholly internal pumps (that is, internal to the pressure vessel 12), or canned pumps having a motor stator external to the pressure vessel 12 and an impeller disposed inside the pressure vessel 12 to engage the primary coolant. Designs of the latter type may employ either a wet rotor or a dry rotor.

A steam generator operates as follows: secondary coolant in the steam generator plenum 34 is heated by primary coolant flowing downward through the tubes 36 such that the steam generator plenum 34 contains secondary coolant as a steam/water mixture. The steam has lower density and naturally tends to rise toward the top of the steam generator plenum 34. A steam outlet 44 (which in some embodiments is an outlet annulus encircling the pressure vessel 12) and steam piping 46 conveys "wet" steam (that is, a mixture of steam and water) to a steam separator 50 (also sometimes referred to in the art as a "steam drum") that separates dry steam from the water phase. The steam separator 50 can employ substantially any type of steam/water phase separation mechanism, such as a combination of cyclone separators and steam dryers (not shown). The resulting dry steam is output as a useful steam output 52, which may by way of illustrative example be input to a turbine of a nuclear electrical power plant. The phase-separated water (i.e., the liquid phase) is returned by drainage piping 54 and a feedwater inlet 56 (which in some embodiments is an inlet annulus encircling the pressure vessel 12) to the steam generator plenum 34. Additionally, the steam output 52 is recondensed and returned into the drainage piping 54 (or, alternatively, directly into the steam generator plenum 34) at a make-up water return 58. Typically, the make-up water comprises recondensed steam as well as some added water to compensate for any water mass that is lost in the turbine or elsewhere in the secondary coolant circuit running from the steam output 52 to the make-up return 58.

The disclosed steam generator differs from a conventional shell-and-tube steam generator which is usually employed as the internal steam generator of an integral PWR. In a shell-and-tube steam generator, primary coolant flows in a first direction (downward) in tubes of the shell-and-tube steam generator and secondary coolant flows in an opposite second direction (upward) in the shell of the shell-and-tube steam generator. (Alternatively, secondary coolant may flows upward in tubes of the shell-and-tube steam generator and primary coolant downward in the shell of the shell-and-tube steam generator). The conventional shell-and-tube steam generator relies upon there being a defined tube-side or shell-side flow path for the secondary coolant, and toward this end requires active pumping to drive the secondary coolant flow through the tubes or shell.

In contrast, the steam generator of FIG. 1 suitably operates in a natural circulation mode with the circulation being driven by elevation of the steam separator 50 respective to the steam generator plenum 34 in conjunction with the buoyancy of (wet) steam compared with water. In this case there is there is no pump configured to actively circulate secondary coolant between the steam generator plenum and the steam separator. (Although the secondary coolant circulation can occur naturally, it is contemplated to enhance the circulation through the use of secondary coolant pumps 60 indicated diagrammatically in phantom in FIG. 1). The steam generator plenum 34 does not include or contain piping arranged to convey secondary coolant along a defined flow path. (In contrast, the shell-and-tube steam generator employs either the tubes or the shell to convey the secondary coolant along a defined flow path which is typically a counter-flow to the primary coolant flow). The steam generator plenum 34 does not define a secondary coolant flow path. Instead, the secondary coolant is merely constrained to reside within the steam generator plenum 34, and any flow pattern of the secondary coolant is driven by convection due to temperature variations rather than by any piping or other defined flow path.

In some embodiments, the steam generator plenum 34 comprises an unsectioned single annulus. Alternatively, the steam generator plenum 34 may be sectioned into two or more sections. For example, FIG. 1 shows two steam separators 50—in such the steam generator plenum 34 may optionally be sectioned into two sections each comprising a half-annulus and each connected with a corresponding one of the two steam separators 50. (Alternatively, both steam separators 50 can be connected with a single full annular steam generator plenum 34 that has no sectioning). Any sectioning of the steam generator plenum 34 should be limited so that individual sections do not become so small as to define narrow flow paths that affect the natural circulation of the secondary coolant. For example, in some embodiments, the steam generator plenum is either (1) a single volume that is not divided into sections or (2) divided into N sections where N is an integer between 2 and 6 inclusive. (Six sections would still have each section encompassing a sizable 60° arc of the steam generator annulus 34, assuming uniform sectioning). In embodiments in which the steam generator annulus 34 is sectioned, each section should be operatively connected with at least one steam separator.

Figure 2:
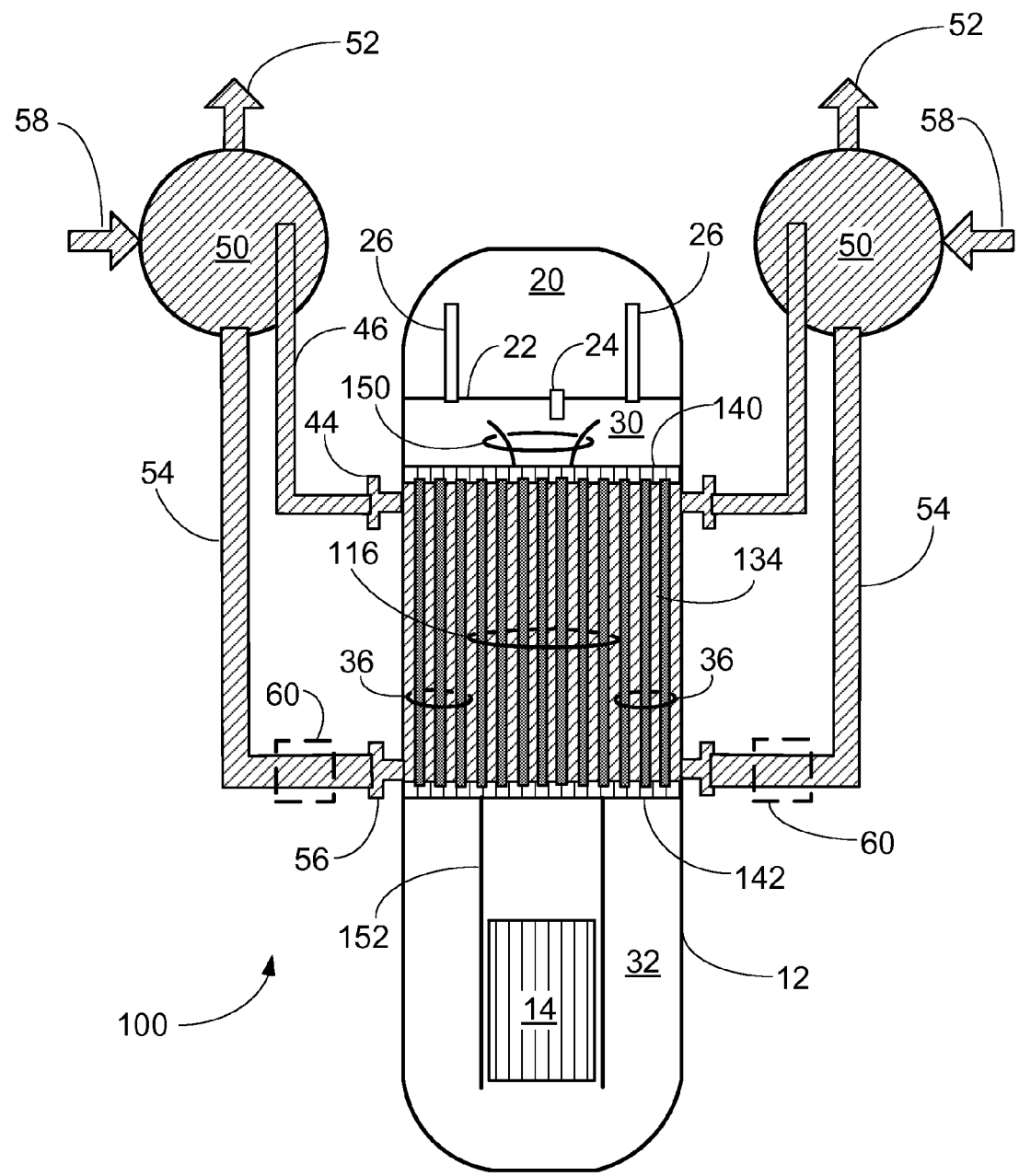

With reference to FIG. 2, a variant illustrative nuclear reactor of the pressurized water reactor (PWR) type 100 includes most of the components of the PWR 10 of FIG. 1. These components are indicated in FIG. 2 using the same reference numbers as in FIG. 1, and their description is not reiterated here. The PWR 100 of FIG. 2 differs from the PWR 10 of FIG. 1 in that the single hollow cylindrical central riser 16 of FIG. 1 is replaced by a plurality of riser tubes 116 in the embodiment of FIG. 2. With the omission of the central riser 16 the steam generator plenum 34 comprising an annular volume, i.e. annulus, becomes a steam generator plenum 134 comprising a cylindrical volume. The riser tubes 116 pass through an inboard cylindrical region of the steam generator plenum 134 and are arranged to convey primary coolant upward from the nuclear reactor core 14 to the upper plenum 30 (thus performing the same primary coolant flow function as the single hollow cylindrical central riser 16 of the embodiment of FIG. 1). The tubes 36 are arranged to convey primary coolant downward from the upper plenum 30 to the lower plenum 32 as in the embodiment of FIG. 1. The tubes 36 pass through an outboard annular region of the steam generator plenum 134 that surrounds the inboard cylindrical region of the steam generator plenum 134. Put another way, the steam generator plenum 136 comprises a single connected volume through which passes both the riser tubes 116 and the tubes 36 arranged to convey primary coolant downward from the upper plenum to the lower plenum.

In some embodiments the annular tube sheets 40, 42 of the embodiment of FIG. 1 become circular tube sheets 140, 142. The upper tube sheet 140 connects with upper ends of the tubes 36 and with upper ends of the riser tubes 116, and the upper tube sheet 140 defines the boundary between the upper plenum 30 and the steam generator plenum 134. The lower tube sheet 142 connects with lower ends of the tubes 36 and with lower ends of the riser tubes 116, and the lower tube sheet 142 defines the boundary between the lower plenum 32 and the steam generator plenum 134. Note that the upper tube sheet 140 serves as the inlet to the tubes 36 but serves as the discharge for the riser tubes 116. Similarly, the lower tube sheet 142 serves as the discharge for the tubes 36 but as the inlet for the riser tubes 116.

In some embodiments the riser tubes 116 and the tubes 36 both have the same cross-section, and in some embodiments the tubes 36 and the riser tubes 116 are substantially the same (i.e., same inner diameter, same outer diameter, same material, et cetera). However, the riser tubes 116 carry the "hot leg" of the primary coolant circuit while the tubes 36 carry the "cold leg" of the primary coolant circuit. While the temperature difference between the hot leg and the cold leg is relatively small, the difference can be large enough to generate a potentially problematic difference in thermal expansion at the operating temperature. To compensate, in some embodiments at 25° C. (i.e., about room temperature) the tension in the riser tubes 116 is greater than the tension in the tubes 36. This room temperature tension difference is chosen such that at operating temperature the tension in the riser tubes 116 and in the tubes 36 is about the same.

Operation of the steam generator of FIG. 2 is substantially similar to operation of the steam generator of FIG. 1. Secondary coolant in the steam generator plenum 134 is heated by primary coolant flowing downward through the tubes 36. In the embodiment of FIG. 2, heating is also provided by primary coolant flowing upward through the riser tubes 116. Because of this heating, the steam generator plenum 134 contains secondary coolant as a steam/water mixture. The steam tends to rise toward the top of the steam generator plenum 134, and the annular steam outlet 44 and steam piping 46 conveys wet steam to the steam separator 50 which generates useful steam output 52, and returns phase-separated water to the steam generator plenum 134 via drainage piping 54 and the annular feedwater inlet 56. Additionally, the steam output 52 is recondensed and returned as make-up water 58. The steam generator of the embodiment of FIG. 2 is expected to be more efficient than the steam generator of FIG. 1 due to additional heating provided by the riser tubes 116. The secondary coolant circulation can be natural circulation controlled by the elevation of the steam separator 50 respective to the steam generator plenum 134. However, it is also again contemplated to include assistive active pumps 60 (shown in phantom).

The primary coolant flow circuit in the embodiment of FIG. 2 is substantially similar to the primary coolant flow circuit in the embodiment of FIG. 1, except that the hot leg passes through riser tubes 116 in FIG. 2 rather than through the single central riser 16 in FIG. 1. In the upper plenum 30 a suitable flow guide 150 is optionally included to ensure separation of the openings of the upper tube sheet 140 that operate as discharge for the riser tubes 116 from the openings that operate as inlets for the tubes 36. Similarly, a shroud 152 ensures separation of the openings of the lower tube sheet 142 that operate as inlets for the riser tubes 116 from the openings that operate as discharge for the tubes 36. In illustrative FIG. 2, the shroud 152 has a hollow annular configuration and also surrounds the reactor core 14.

Not illustrated are remaining components of a nuclear reactor such as the containment structure configured to contain radioactive steam escaping from the pressure vessel in the event of an accident, an external turbine (in the case of a nuclear power electrical plant), or so forth. Typically, the containment structure will contain both the pressure vessel 12 and the steam separator 50.

The disclosed integral PWR systems as described with reference to illustrative embodiments 10, 110 have certain advantages over more conventional systems that employ conventional a shell-and-tube steam generator disposed in the downcomer annulus between the central riser and the inner wall of the cylindrical pressure vessel. The steam generators disclosed herein are expected to reduce tube mass by 40-50% due to elimination of piping defining secondary coolant flow paths. This reduces cost and has ancillary benefits such as reduced mass to be moved during refueling (and hence simplified refueling), a higher secondary coolant inventor (since the entire steam generator plenum 34, 134 is substantially filled with secondary coolant, rather than filling only the tubes or shell of a shell-and-tube steam generator), and so forth. Additionally, if the steam separator 50 is located inside the containment structure than by valving off the steam outlet 52 and the return 58 a natural circulation emergency core cooling system (EGOS) component is defined. (In other words, the closed natural circulation steam generator system can be used to assist removal of residual heat). The embodiment of FIG. 2 may also reduce manufacturing cost by eliminating the large hollow cylindrical central riser 16 and enhancing component interchangeability by using the same tubing for both the riser tubes 116 and the tubes 36.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

I claim:
1. An apparatus comprising:
   a pressurized water reactor (PWR) including:
      a pressure vessel divided into an upper plenum containing primary coolant, a lower plenum containing primary coolant, and a steam generator plenum including a first section defining a first volume, a second section defining a second volume, a steam outlet and a feedwater inlet, the steam generator plenum being interposed between the upper plenum and the lower plenum and containing secondary coolant,
   wherein secondary coolant in the first section is kept separated from secondary coolant in the second section;
      a nuclear reactor core comprising fissile material disposed in the lower plenum;
      one or more risers arranged to convey primary coolant upward from the nuclear reactor core to the upper plenum;
      a plurality of tubes passing through the steam generator plenum and arranged to convey primary coolant downward from the upper plenum to the lower plenum; and
   a steam separator operatively connected with the steam outlet and the feedwater inlet of the steam generator plenum to separate secondary coolant in a steam phase from secondary coolant in a water phase and return the secondary coolant in the water phase to the steam generator plenum by way of the feedwater inlet,
   wherein the steam separator is outside of the pressure vessel and elevated above the steam generator plenum so that natural circulation of the secondary coolant occurs in the steam generator plenum.
2. The apparatus of claim 1, wherein the one or more risers comprise:
   a hollow cylindrical central riser disposed within the pressure vessel;
   wherein the steam generator plenum comprises a steam generator annulus encircling the hollow cylindrical central riser.

3. The apparatus of claim 1, further comprising:
an upper annular tube sheet connecting with upper ends of the plurality of tubes arranged to convey primary coolant downward from the upper plenum to the lower plenum and defining the boundary between the upper plenum and the steam generator plenum; and
a lower annular tube sheet connecting with lower ends of the plurality of tubes arranged to convey primary coolant downward from the upper plenum to the lower plenum and defining the boundary between the lower plenum and the steam generator plenum.

4. The apparatus of claim 1, wherein the one or more risers comprise:
a plurality of riser tubes passing through the steam generator plenum;
wherein the riser tubes are inboard of and surrounded by the plurality of tubes arranged to convey primary coolant downward from the upper plenum to the lower plenum.

5. The apparatus of claim 4, wherein the steam generator plenum comprises a single connected volume through which passes both the riser tubes and the plurality of tubes arranged to convey primary coolant downward from the upper plenum to the lower plenum.

6. The apparatus of claim 4, wherein the steam generator plenum comprises a cylindrical volume through which passes both the riser tubes and the tubes arranged to convey primary coolant downward from the upper plenum to the lower plenum.

7. The apparatus of claim 4, wherein the riser tubes have the same cross-section as the tubes arranged to convey primary coolant downward from the upper plenum to the lower plenum.

8. The apparatus of claim 4, further comprising:
an upper tube sheet connecting with upper ends of the plurality of tubes arranged to convey primary coolant downward from the upper plenum to the lower plenum and with upper ends of the riser tubes, wherein the upper tube sheet defines the boundary between the upper plenum and the steam generator plenum; and
a lower tube sheet connecting with lower ends of the plurality of tubes arranged to convey primary coolant downward from the upper plenum to the lower plenum and with lower ends of the riser tubes, wherein the lower tube sheet defines the boundary between the lower plenum and the steam generator plenum.

9. The apparatus of claim 8 wherein at 25° C. the tension in the riser tubes is greater than the tension in the plurality of tubes arranged to convey primary coolant downward from the upper plenum to the lower plenum.

10. The apparatus of claim 1, wherein the steam generator plenum contains secondary coolant as a steam/water mixture.

11. The apparatus of claim 1, wherein there is no pump operatively disposed between the steam generator plenum and the steam separator, and the steam generator plenum and the steam separator are configured to circulate the secondary coolant by natural circulation.

12. The apparatus of claim 1, wherein an outer annular wall of the steam generator plenum comprises an inside wall of the pressure vessel.

13. The apparatus of claim 1, further comprising:
a containment structure containing both the pressure vessel and the steam separator, the containment structure being configured to contain radioactive steam escaping from the pressure vessel.

14. An apparatus comprising:
a pressurized water reactor (PWR) including:
a pressure vessel divided into an upper plenum containing primary coolant, a lower plenum containing primary coolant, and a steam generator plenum including a first section defining a first volume, a second section defining a second volume, a steam outlet and a feedwater inlet, the steam generator plenum being interposed between the upper plenum and the lower plenum and containing secondary coolant,
wherein secondary coolant in the first section is kept separated from secondary coolant in the second section;
a nuclear reactor core comprising fissile material disposed in the lower plenum;
one or more risers arranged to convey primary coolant upward from the nuclear reactor core to the upper plenum;
a plurality of tubes passing through the steam generator plenum and arranged to convey primary coolant downward from the upper plenum to the lower plenum; and
a steam separator disposed outside of the pressure vessel and operatively connected with the steam generator plenum to separate secondary coolant in a steam phase from secondary coolant in a water phase and return the secondary coolant in the water phase to the steam generator plenum by way of the feedwater inlet,
wherein there is no pump arranged to pump secondary coolant between the steam generator plenum and the steam separator,
wherein the steam separator is arranged to allow natural circulation of the secondary coolant in the steam generator plenum.

15. An apparatus comprising:
a pressurized water reactor (PWR) including:
a pressure vessel divided into an upper plenum containing primary coolant, a lower plenum containing primary coolant, and a steam generator plenum including a first section defining a first volume, a second section defining a second volume, a steam outlet and a feedwater inlet, wherein the steam generator plenum is interposed between the upper plenum and the lower plenum and containing secondary coolant,
wherein secondary coolant in the first section is kept separated from secondary coolant in the second section;
a nuclear reactor core comprising fissile material disposed in the lower plenum;
one or more risers arranged to convey primary coolant upward from the nuclear reactor core to the upper plenum;
a plurality of tubes passing through the steam generator plenum and arranged to convey primary coolant downward from the upper plenum to the lower plenum; and
a steam separator disposed outside of the pressure vessel and operatively connected with the steam generator plenum to separate secondary coolant in the steam phase from secondary coolant in the water phase and return the secondary coolant in the water phase to the steam generator plenum by way of the feedwater inlet,
wherein the steam separator is arranged to allow natural circulation of the secondary coolant in the steam generator plenum.

16. The apparatus of claim 15, wherein the steam generator plenum does not include or contain a shell-and-tube steam generator in which one of primary coolant and secondary coolant flows in one direction in tubes of the shelland-tube steam generator and the other of primary coolant and secondary coolant flows in an opposite direction in the shell of the shell-and-tube steam generator.

17. An apparatus comprising:
- a pressurized water reactor (PWR) including:
  - a pressure vessel divided into an upper plenum containing primary coolant, a lower plenum containing primary coolant, and a steam generator plenum including a first section defining a first volume, a second section defining a second volume, a steam outlet and a feedwater inlet, wherein the steam generator plenum is interposed between the upper plenum and the lower plenum and containing secondary coolant,
- wherein secondary coolant in the first section is kept separated from secondary coolant in the second section;
  - a nuclear reactor core comprising fissile material disposed in the lower plenum;
  - a plurality of riser tubes passing through an inboard cylindrical region of the steam generator plenum and arranged to convey primary coolant upward from the nuclear reactor core to the upper plenum;
  - a plurality of tubes arranged to convey primary coolant downward from the upper plenum to the lower plenum, wherein the plurality of tubes arranged to convey primary coolant downward from the upper plenum to the lower plenum pass through an outboard annular region of the steam generator plenum that surrounds the inboard cylindrical region of the steam generator plenum; and
- a steam separator disposed outside of the pressure vessel and operatively connected with the steam generator plenum to separate secondary coolant in a steam phase from secondary coolant in a water phase and return the secondary coolant in the water phase to the steam generator plenum by way of the feedwater inlet, and
- wherein the steam separator is elevated above the steam generator plenum so that natural circulation of the secondary coolant occurs in the steam generator plenum.

* * * * *